H. A. MYERS.
TICKET ISSUING MECHANISM.
APPLICATION FILED OCT. 1, 1919.

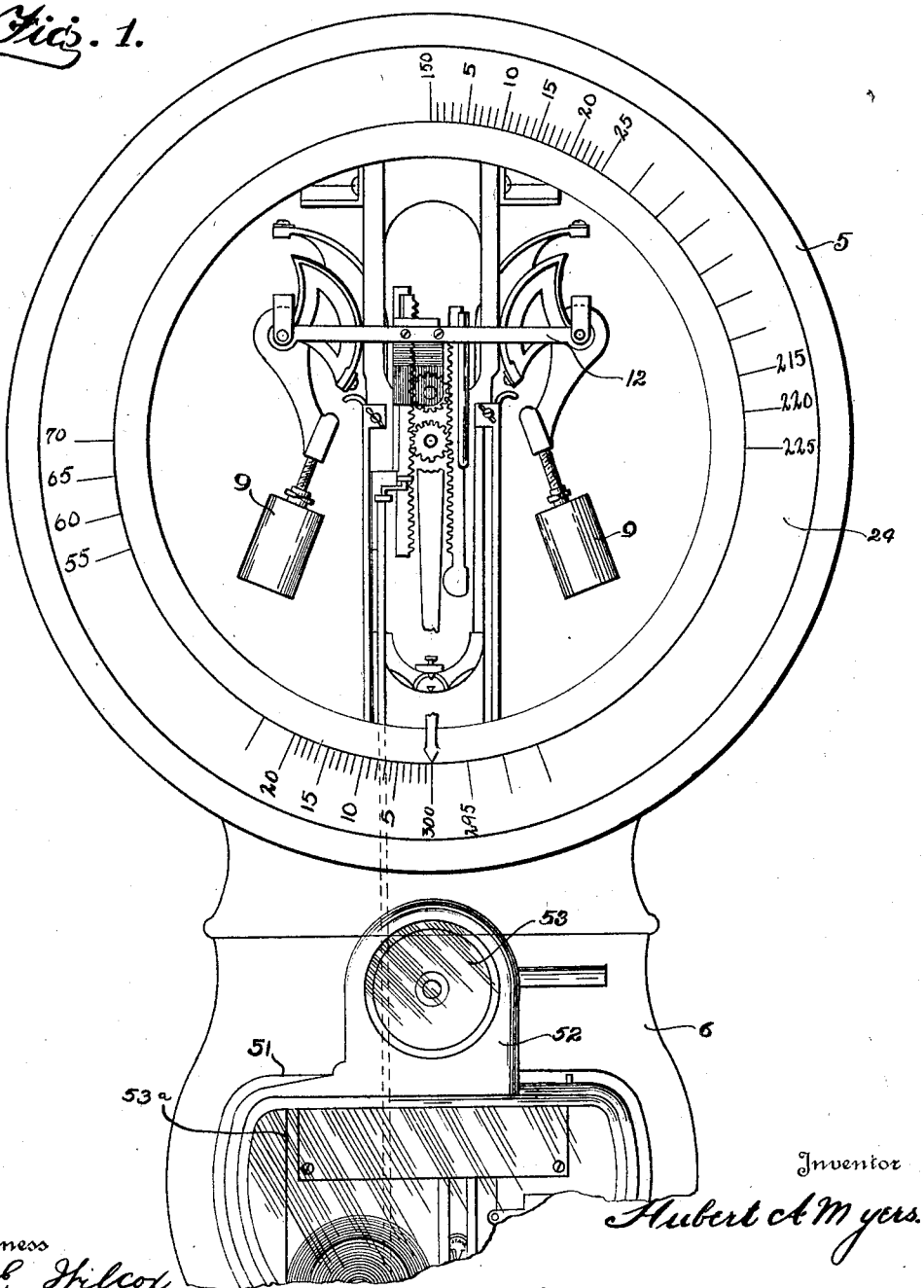

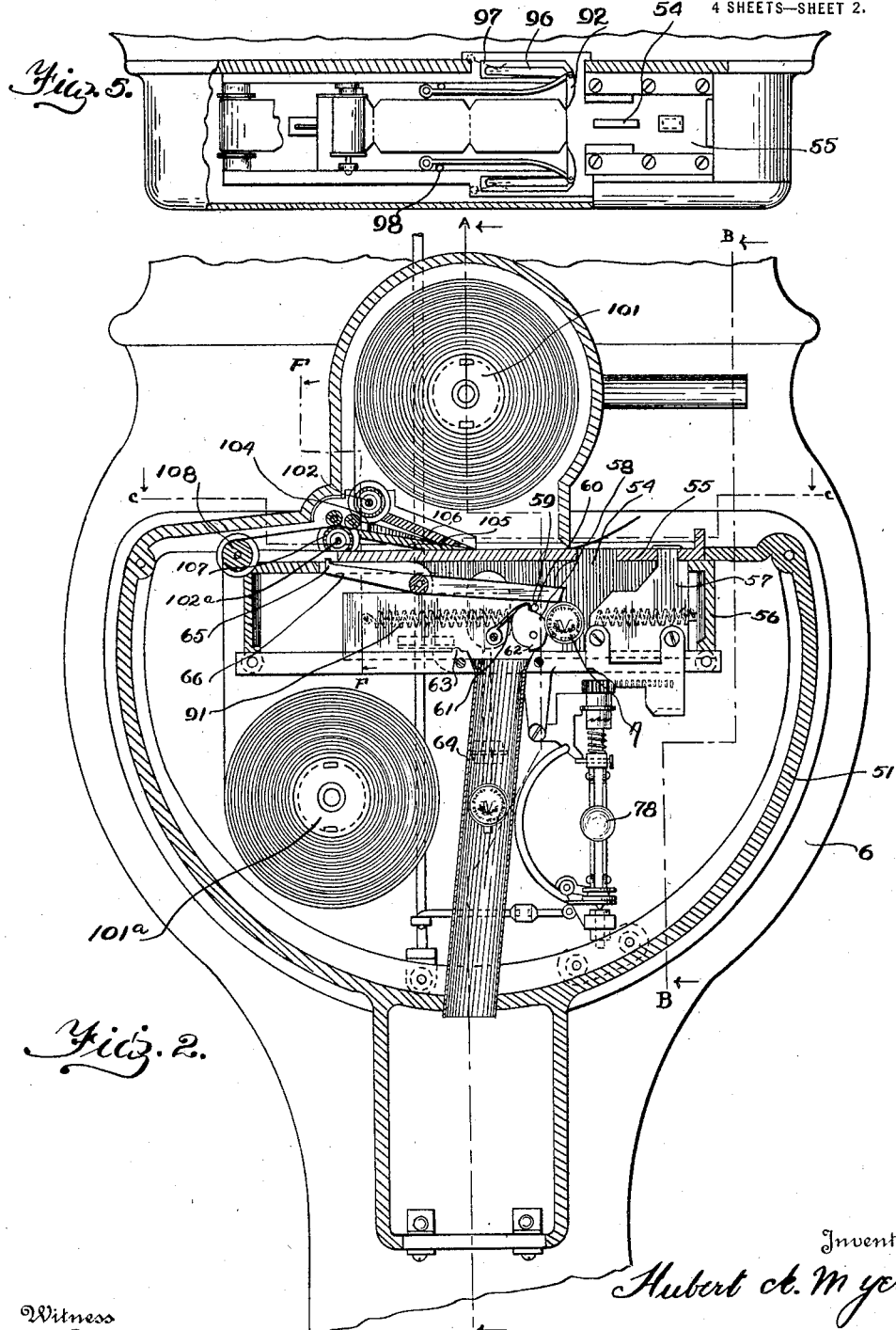

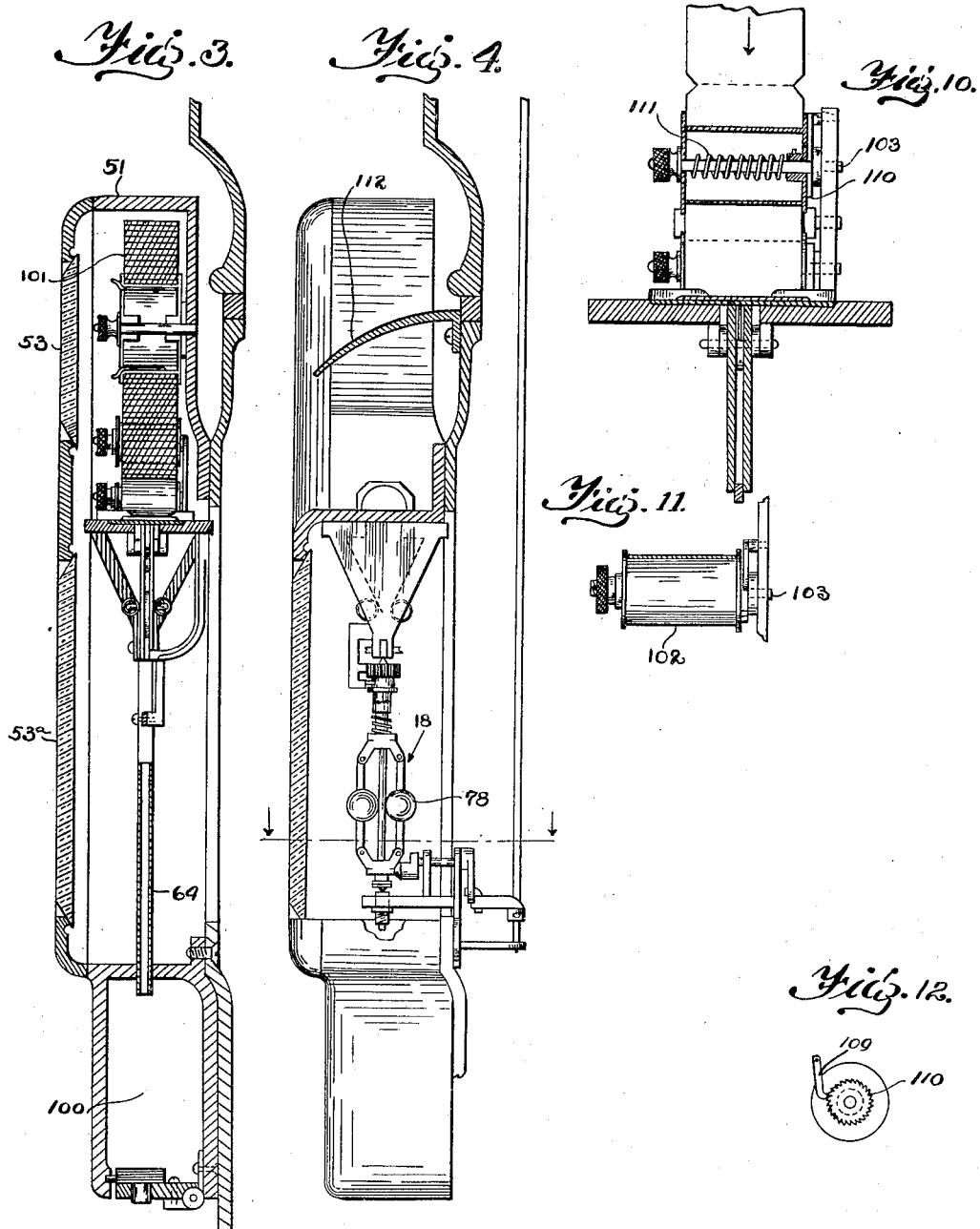

1,385,388.

Patented July 26, 1921.
4 SHEETS—SHEET 4.

Witness
C. E. Wilcox.

Inventor
Hubert A. Myers

By George R. Frye
Attorney

UNITED STATES PATENT OFFICE.

HUBERT A. MYERS, OF TOLEDO, OHIO, ASSIGNOR TO TOLEDO SCALE COMPANY, OF TOLEDO, OHIO, A CORPORATION OF NEW JERSEY.

TICKET-ISSUING MECHANISM.

1,385,388.  Specification of Letters Patent.  Patented July 26, 1921.

Application filed October 1, 1919. Serial No. 327,775.

*To all whom it may concern:*

Be it known that I, HUBERT A. MYERS, a citizen of the United States, residing at Toledo, in the county of Lucas and State of Ohio, have invented certain new and useful Improvements in Ticket-Issuing Mechanism, of which the following is a specification.

This invention relates to ticket-issuing mechanism, and more particularly ticket-issuing mechanism operated by coin-controlled apparatus.

Among the principal objects of this invention is the provision of a simple and efficient mechanism which, when a strip of tickets carried by one reel is exhausted, will automatically issue tickets from a supplemental reel or reels.

Another object of the invention is the provision of a simple and dependable mechanism by which advantage may be taken of the notched formation of certain forms of strip tickets now in common use.

Another object is the incorporation of ticket-issuing mechanism in a compact structure which may be constructed as an auxiliary to a coin-operated controlling device adapted for use with weighing scales and which can be readily fixed in place and as readily detached.

With the above and other objects in view which will readily appear from the following description, my invention consists of the novel construction, combination and arrangement of elements to be hereinafter more fully described, illustrated in the accompanying drawings, and particularly pointed out in the subjoined claims.

Reference is to be had to the accompanying drawings illustrating a preferred embodiment of my invention and wherein similar reference numerals designate similar parts throughout the several views.

In the drawings:—

Figure 1 is a partial front elevation of a weighing scale equipped with my improved mechanism;

Fig. 2 is a front elevation, with parts in section, of the ticket-issuing mechanism forming the subject matter of this application and coin-operated controlling device therefor;

Fig. 3 is a vertical section taken substantially on the line A—A of Fig. 2;

Fig. 4 is a similar section taken substantially on the line B—B of Fig. 2;

Fig. 5 is a horizontal section taken substantially on the line C—C of Fig. 2;

Fig. 10 is a section taken substantially on the line F of Fig. 2;

Fig. 11 is a detail elevation of a guide roller forming part of the ticket-issuing mechanism; and Fig. 12 is a detail elevation of the ratchet mechanism of the guide roller.

Figure 6:
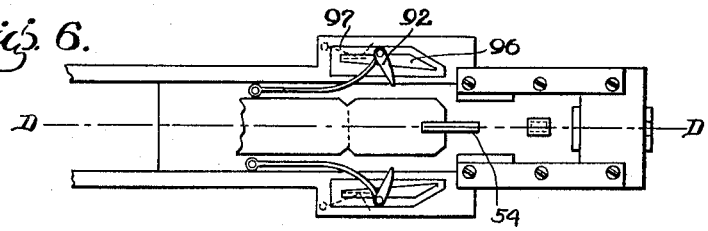
Fig. 6 is a plan view of the ticket-issuing mechanism showing the feeding dogs and guide slots therefor, the parts being in intermediate position.

Referring to the drawings, 5 designates a scale housing adapted to inclose the load-offsetting or counterbalacing mechanism of the scale and supported upon a suitable column 6. It is to be understood that any suitable platform and platform lever mechanism may be employed in connection with the weighing or load-offsetting mechanism of the scale, and that the weighing mechanism of the scale may be of any approved type, various mechanisms well known in the scale are being fully capable of performing the required functions. The embodiment herein illustrated is one that has been found to successfully demonstrate the capabilities of this invention, and shows a double pendulum scale of a well-known type adapted to be suitably connected with the platform lever mechanism of the scale so that upon the placing of a load upon the scale platform the pendulums 9 will be moved to a position counterbalancing the weight of the load on the platform. Inasmuch as the present invention is not dependent upon any particular form of scale mechanism no attempt is made in this application to show a complete scale mechanism nor to delineate the action of the scale in its load-offsetting or weighing operations, only so much of the scale mechanism being shown as is necessary to clearly portray the operation and co-action of the coin-controlled mechanism associated with the ticket-issuing mechanism forming the claimed invention herein disclosed. During the swinging movement of the pendulums to offset the weight of the load, the crossbars 12 are moved vertically upward, and through the medium of this vertical movement of the crossbars the weight indication is effected.

The indicating mechanism of the scale herein shown is so constructed and connected that no indication will be given upon the operation of the weighing mechanism of the scale because of the locking of the indicating mechanism by the coin-controlled locking and releasing mechanism.

Figure 7:
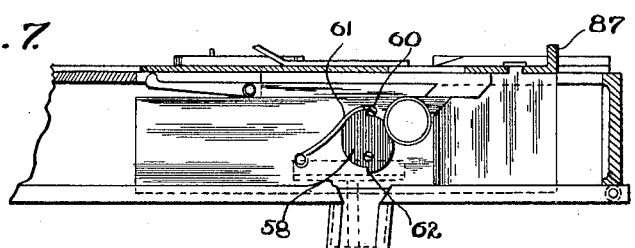
Fig. 7 is a vertical section on the line D—D of Fig. 6.
Figure 9:
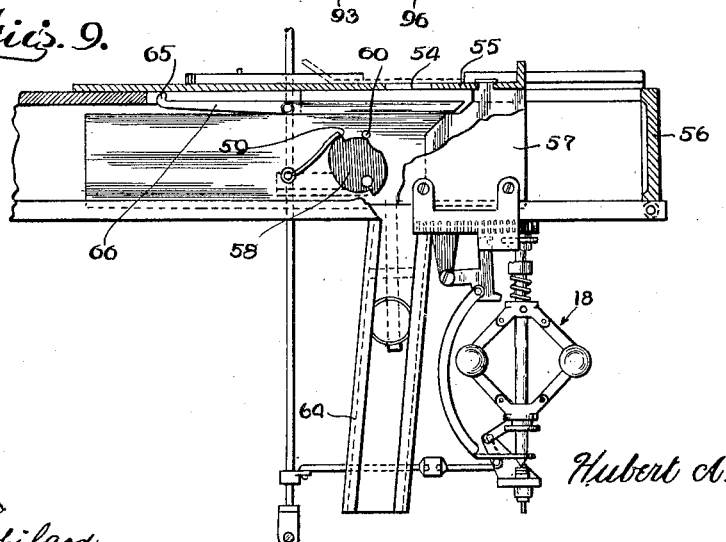
Fig. 9 is a sectional elevation taken substantially on the line E—E of Fig. 8 and also showing a centrifugal device for releasing the weight indicator, in elevation.

The coin-operated controlling mechanism is inclosed within a housing 51 of substantially the shape shown in Figs. 1 and 3 and adapted to be secured upon the forward portion of the column 6 to which it is secured by screws or other suitable fastening means. The front of the housing 51 is formed as a scroll 52 and carries an upper and lower glass plate 53 and 53ª respectively through which may be seen the ticket rolls, coin-chute, centrifugal mechanism and other elements of the controlling device. As shown in Figs. 2 and 5, a slot 54 for the insertion of a coin or check is located in the upper plate 55 of a slidable coin-carrying mechanism which is mounted for reciprocating movement within a frame 56 carried by the housing 51. The slot 54 is arranged above the inner end of a thrust plate 57, which is provided at its upper corner with an inclined portion to guide the coin after its insertion through the slot into substantially the position of the coin A shown in Fig. 2 of the drawings, wherein the edge of the coin contacts with the end wall of the thrust plate 57 and the adjacent edge of an irregularly-shaped baffle plate 58 pivoted eccentrically upon a pin mounted in the opposite side walls of the slidable coin-carrying mechanism. At its upper extremity the baffle plate 58 is formed with a shoulder 59 adapted to normally contact with a stop 60 secured in the frame of the slide mechanism, the shoulder 59 being pressed into this position by the leaf spring 61, as shown in Fig. 7. At its lower extremity the baffle plate 58 is formed with a shoulder 62, as shown, to contact with an upwardly-extending lug 63 upon the base of the supporting frame 56 as the slidable coin-carrying mechanism approaches the limit of its sliding movement, the lug 63 being positioned to engage the shoulder 62 and stop the motion of the lower portion of the baffle plate 58 slightly before the coin-carrying mechanism finishes its stroke, the further movement of the coin-carrying mechanism then serving to rotate the baffle plate 58 into substantially the position shown in Fig. 9, in which position the edge of the baffle plate is moved sufficiently away from the edge of the thrust plate 57 to allow space for the passage of the coin into the coin-chute 64, the coin falling by gravity into the coin-chute as soon as sufficient passageway has been yielded by the swinging movement of the baffle plate 58. The coin-carrying mechanism is normally capable of limited sliding movement and is prevented from moving beyond this limit by the upwardly-projecting lug 65 at the rear end of the lever 66, which lever is pivoted intermediate its ends upon a shaft carried by the frame 56 and is provided with a forward arm of greater weight than the rear arm carrying the lug 65 so that the lug 65 is normally held in raised position. The free end of the forward arm of the lever 66 is inclined, as shown in Fig. 2, and this inclined portion is arranged so as to be contacted by the upper portion of a coin held between the baffle plate 58 and thrust plate 57 during the sliding movement of the coin-carrying mechanism. When the coin contacts the inclined portion of the lever 66 the forward arm of the lever is forced upwardly, lowering the lug 65 upon the rear extremity of this lever out of the path of movement of the top plate 55 of the coin-carrying mechanism, the lever remaining in this position with the lug lowered until the coin-carrying mechanism is returned to its normal position.

The coin-controlled mechanism above described is herein shown as so connected to the indicating mechanism of the scale as to prevent any indication of the weight upon the platform until the coin-controlled mechanism has been operated. The connections between the coin-controlled apparatus and the indicating mechanism include a centrifugal device 18 (having characteristics similar to those of the well-known fly-ball governor) which is set in motion by sliding movement of the coin-carrying mechanism. The spinning of the centrifugal device releases the indicating mechanism of the scale and permits the weight to be indicated upon the dial 24. Since the indicating mechanism and the coin-operated controlled mechanism are respectively described and claimed in my co-pending applications Nos. 327,774 and 327,773, filed on even date herewith, no attempt is made in this application to completely show or describe nor delineate the action thereof, only so much of the indicating and controlling mechanism being shown and described as will serve to portray the co-action of such mechanism with the ticket-issuing mechanism forming the claimed invention herein disclosed.

Figure 8:
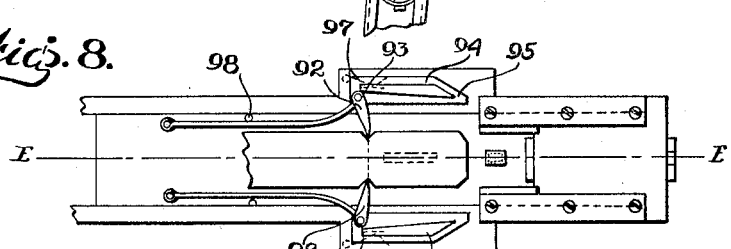
Fig. 8 is a view similar to that shown in Fig. 6, with the parts in their innermost position.

I have shown the ticket-issuing device in conjunction with a coin-operated weighing scale, but it is of course obvious that it may be used with other coin-controlled apparatus or alone. The specific embodiment illustrated in this application comprises a pair of feeding dogs shaped substantially as shown in Figs. 6 and 8 and resiliently mounted upon pins extending upwardly from the top plate 55 of the slidable coin-carrying mechanism. The dogs 92 are each provided with a downwardly-extending guide pin 93 projecting into the irregularly-shaped slot 94 formed in the frame 56, this slot being preferably provided with an inclined front wall 95, a straight rear wall, and parallel side walls, substantially as shown. Pivoted adjacent its rear end in a central position within each slot 94 is an irregularly-shaped guide 96 which is normally pressed by means of a weak leaf-spring 97 into substantially the position shown in Fig. 5, the pivoted guide 96 being provided with an inclined front wall adapted to be parallel with the inclined wall 95 of the irregular slot 94 when the guide is in this position. Upstanding lugs 98 engage the central portion of the resilient feed dogs 92 and serve to reinforce and guide the feed dogs in their bending movements, as will now be described. The heads of the feed dogs 92 remain in substantially the position shown in Fig. 5 when the device is at rest. After a person has inserted a coin through the slot 54 and partially slid the coin-carrying slide mechanism in the manner hereinbefore described, he advances the top plate 55 and the feed dogs 92 pivoted thereon to an intermediate position such as is shown in Fig. 6, the pins 93 on the feed dogs having ridden up the inclined walls of the guide 96 and slot 94 and moved rearwardly adjacent the outermost side wall of the slot 94 to the position shown. Further sliding of the coin-carrying mechanism through pressure on the lug 87 serves to bring the top plate 55 to the limit of its sliding movement, moving the feed dogs 92 to the rear wall of the slot 94, in which position the pin 93 is clear of the pivoted guide 96, whereupon the heads of the feed dogs 92 spring inwardly to a position adjacent the innermost side wall of the slot 94, the position then assumed being substantially as shown in Fig. 8, the pins clearing the innermost wall of the guide 96 and the heads projecting into notches formed in the ticket feed strip in position to separate one ticket from the next. Upon the return of the coin-carrying slide mechanism to its normal position, through the medium of the springs 91, the heads of the dogs 92 are moved straight forward with the top plate 55, the pins 93 being guided between the innermost side wall of the slot 94 and the adjacent side wall of the pivoted guide 96, the guide 96 swinging outwardly from the position shown in Fig. 8 to give clearance to the pins 93, the leaf-springs 97 returning the guide to its original position as soon as the feed dogs have reached their normal position adjacent the front wall of the slot 94. During this forward movement of the feed dogs the ticket strip is advanced so that one ticket is ejected beyond the wall of the casing 51 into substantially the position shown in Fig. 2. The ticket feed strip is preferably rolled upon a reel 101 mounted upon a stub shaft projecting from the rear wall of the casing 51, and comprising a drum having a fixed side wall at one extremity and springs arranged to secure in position a removable side wall at the other extremity, the removable wall being provided so as to enable the ready assembly of the ticket strip upon the reel. The ticket strip extends from the reel 101 to a guide roller 102 mounted upon a stub shaft 103 projecting from a bracket supported upon the frame 56, the feed strip passing around the periphery of the guide roller and then over a pivoted guide plate 104 into a slot formed between the upper and lower walls 105 and 106 respectively of a guide-chute into position to be engaged by the feed dogs 92 in the operation of the coin-carrying slide mechanism. An idler roller 107 is mounted adjacent the periphery of the roller 102 to hold the feed strip in contact with the periphery of the guide roller. A second reel 101$^a$, may also be employed, and is preferably positioned as shown in Fig. 2, the feed strip mounted thereon extending over an idler 108, then over a feed roller 102$^a$ and into the guide-chute, passing on the opposite side of the pivoted guide plate 104 from the ticket strip extending from the reel 101.

Means are herein shown for enabling the ticket strip extending from either of the reels 101 or 101$^a$ to supplement the other and follow the last ticket of the other feed strip into position to be engaged by the feed dogs 92 so that the transfer from the first feed strip to the second will automatically take place. The guide roller 102 is loosely mounted upon the stub shaft 103, as is the ratchet wheel 110 adapted to co-act with a pawl pivoted upon the bracket. A coil spring 111 surrounds the shaft 103 and is secured at one end to the hub of the ratchet wheel 110 and at its other end to the guide roller 102, the arrangement being such that the guide roller 102 is free to rotate in one direction without affecting the rotation of the ratchet wheel 110, but is held from independent movement in the opposite direction. In positioning the ticket strip for operation, the ticket strip is passed between the guide roller 102 and idler 107, then through the slot in the guide-chute, and then advanced to the position shown in Fig. 5 of the drawing—*i. e.*, is pulled forward a distance beyond the slot in the guide-chute corresponding to the distance to which the ticket must advance after all the tickets in the other reel have been issued. After the ticket strip has been advanced to this position, it is retracted to a position wherein the forward edge of the feed strip is immediately behind the slot in the guide-chute, this retracting movement serving to wind the spring 111 in the guide roller 102 to the extent necessary to again advance the feed strip into the desired position as soon as the path is clear for the advance of this strip, the feed strip being prevented from being immediately advanced to this position by the pressure of the pivoted guide plate 104 against it, and the fact that the ticket strip from the other reel is then passed through the slot in the guide-chute. The construction of the guide roller 102ᵃ is identical with that of the roller 102, and the ticket strip passing thereover is first positioned in the manner above described, the only difference being that in its passage through the guide-chute this second ticket strip passes under the pivoted guide plate 104, as shown in Fig. 2.

Suitable locking means are provided for preventing the unwarranted removal of the scroll 52, and a door provided with a suitable lock may be arranged to allow the removal of the coins in the coin receptacle 100 without exposing the operating mechanisms.

A cover plate 112 extends from the uppermost portion of the casing 51 over the slot 54 in the top plate 55 so as to protect the mechanism from rain, etc., when the scale is exposed in the open air.

While it will be apparent that the illustrated embodiment of my invention is well calculated to adequately fulfil the objects of the invention primarily stated, it is to be understood that the invention is susceptible to variation, modification and change without departing from the spirit and scope of the invention as set forth in the subjoined claims.

Having described my invention, I claim:

1. In a device of the character described, ticket-issuing mechanism comprising a slidable member, a pair of feed dogs connected therewith, plates having slots in which the heads of said feed dogs are guided, and pivoted guides arranged in said slots to control the position of the feed dogs during the sliding movement of said member.

2. In a device of the character described, ticket-issuing mechanism comprising a slidable member, a pair of resilient feed dogs connected therewith, plates having slots in which the heads of said feed dogs are guided, and pivoted guides arranged in said slots to control the position of the feed dogs during the sliding movement of said member.

3. In a device of the character described, ticket-issuing mechanism comprising a slidable member, a pair of feed dogs connected therewith, plates arranged on opposite sides of the slidable member and provided with guide slots having parallel side walls at right angles to one end wall and a portion of the other end wall inclined, pins extending from the heads of the feed dogs into said slots, and pivoted guides arranged in said slots to control the position of the feed dogs during the sliding movement of said member.

4. In a device of the character described, ticket-issuing mechanism comprising a slidable member, a pair of feed dogs connected therewith, plates arranged on opposite sides of the slidable member and provided with guide slots having parallel side walls at right angles to one end wall and a portion of the other end wall inclined, pins extending from the heads of the feed dogs into said slots, and guides pivoted adjacent the rear wall of the slots and arranged to control the position of the feed dogs during the sliding movement of said member.

5. In a device of the character described, ticket-issuing mechanism comprising a slidable member, a pair of feed dogs connected therewith, plates arranged on opposite sides of the slidable member and provided with guide slots having parallel side walls at right angles to one end wall and a portion of the other end wall inclined, pins extending from the heads of the feed dogs into said slots, guides pivoted adjacent the rear wall of the slots and arranged to control the position of the feed dogs during the sliding movement of said member, and springs normally pressing the pivoted guides toward each other.

6. In a ticket-issuing device for projecting strips of paper having notches along its edges, in combination, a reciprocatory member, a pair of dogs carried by said member, means for holding said dogs in engagement with said notches during movement of said reciprocatory member in one direction, and means for moving said dogs out of engagement with said paper during movement of said member in the other direction.

7. In a device for intermittently moving a strip of paper having notches along its edges, in combination, a pair of dogs, means for moving said dogs toward each other whereby they are caused to engage such notches, means for giving a parallel reciprocatory movement to said dogs, and means for moving said dogs away from each other to disengage them from said paper during the reciprocatory movement in one direction.

8. In a device for intermittently moving a ticket strip having notches along its edges, in combination, a pair of dogs, resilient means for moving said dogs toward each other whereby they are caused to engage such notches, means for giving a parallel reciprocatory movement to said dogs, and means for moving said dogs away from each other to disengage them from said ticket strip during the reciprocatory movement in one direction.

9. In a device for intermittently moving a ticket strip having notches along its edges, in combination, a reciprocatory member, a pair of oppositely-arranged dogs connected thereto and adapted to engage the ticket strip, and means for giving each of said dogs a four-way movement upon reciprocation of said member and thereby disengaging said dogs from the ticket strip during reciprocatory movement in one direction.

10. In a device of the class described, a reciprocatory member, a pair of feed dogs connected therewith, a stationary member having a pair of trapezoidal guide slots formed therein, projections on said dogs extending into said slots, and means for guiding said projections about the edges of said slots.

11. In a device of the class described, in combination, a ticket reel, a device for issuing tickets from said reel, a supplemental reel, and means acting automatically upon exhaustion of the supply of tickets from the first said reel to supply said issuing device from said supplemental reel.

12. In a ticket-issuing device, in combination, a pair of ticket reels each provided with a strip of tickets, a pair of walls having a passage therebetween for guiding the movement of both ticket strips, and an obstructing member arranged to permit the passage of a single strip of tickets on either side thereof and restrain the passage of the second strip.

13. In a ticket-issuing device, in combination, a pair of ticket reels, a pair of walls having a converging passage therebetween, an obstructing member in said passage arranged to permit the passage of a single strip of tickets on either side thereof.

14. In a ticket-issuing device, in combination, a pair of ticket reels, a pair of walls having a passage therebetween, an obstructing member in said passage arranged to permit the passage of a single strip of tickets on either side thereof, and means acting automatically upon the removal of the strip supplied from one reel from one side of said obstructing member to force a strip supplied from the other reel by the other side of the obstructing member.

15. In a device of the class described, in combination, a pair of reels, ticket-issuing mechanism, means tending to feed a strip of tickets from one of said reels to said issuing mechanism, and an obstructing member preventing the operation of said feeding means while said issuing mechanism is supplied from the other of said rolls.

16. In a device of the class described, in combination, a pair of reels, ticket-issuing mechanism, a spring-mounted roller tending to feed a strip of tickets from one of said reels to said issuing mechanism, and an obstructing member preventing the operation of said spring-mounted roller while said issuing mechanism is supplied from the other of said rolls.

17. In a device of the class described, in combination, a pair of reels, ticket-issuing mechanism, a pair of walls forming a passage between said reels and said ticket-issuing mechanism, a pair of rollers adapted to receive between them a strip of tickets from one of said reels, a spring tending to rotate said rollers to force said strip between said walls, and means preventing the passage of said strip while the issuing mechanism is being supplied from the other of said rollers.

18. In a device of the class described, in combination, a pair of reels, ticket-issuing mechanism, a pair of walls forming a passage between said reels and said ticket-issuing mechanism, a pair of rollers adapted to receive between them a strip of tickets from one of said reels, a spring tending to rotate said rollers to force said strip between said walls, and means preventing the passage of said strip while the issuing mechanism is being supplied from the other of said rollers, said means comprising a pivoted member mounted between said walls and arranged to selectively permit the passage of a single strip of tickets only.

19. In a device of the class described, in combination, a pair of reels, ticket-issuing mechanism, a pair of walls forming a converging passage between said reels and said ticket-issuing mechanism, a pair of rollers adapted to receive between them a strip of tickets from one of said reels, a spring tending to rotate said rollers to force said strip between said walls, and means preventing the passage of said strip while the issuing mechanism is being supplied from the other of said rollers, said means comprising a wedge-shaped pivoted member mounted between said walls and arranged to selectively permit the passage of a single strip of tickets only on either side thereof.

20. In a device of the class described, a plurality of reels, ticket-issuing mechanism, and automatically-acting means for successively supplying said ticket-issuing mechanism from said reels.

HUBERT A. MYERS.

Witnesses:
C. E. WILCOX,
C. O. MARSHALL.